United States Patent [19]

Bowman

[11] 4,208,149
[45] Jun. 17, 1980

[54] ELECTRODE CONNECTING PIN ASSEMBLY

[75] Inventor: Donald K. Bowman, Niagara Falls, N.Y.

[73] Assignee: Airco, Inc., Montvale, N.J.

[21] Appl. No.: 954,948

[22] Filed: Oct. 25, 1978

[51] Int. Cl.² .............................................. H05B 7/14
[52] U.S. Cl. .................................. 403/267; 403/296; 13/18 C
[58] Field of Search ................ 403/296, 28, 265, 266, 403/267; 13/18 C; 156/91, 331

[56] References Cited

U.S. PATENT DOCUMENTS

| 2,957,716 | 10/1960 | Kaufmann et al. . | |
|---|---|---|---|
| 2,970,854 | 2/1961 | Johnson . | |
| 3,048,433 | 8/1962 | Doetsch . | |
| 3,048,434 | 8/1962 | Johnson et al. | 403/296 X |
| 3,072,558 | 1/1963 | Myers et al. | 13/18 C |
| 3,084,419 | 4/1963 | Doetsch et al. . | |
| 3,088,762 | 5/1963 | Kaufmann et al. . | |
| 3,134,616 | 5/1964 | Kaufmann . | |
| 3,140,967 | 7/1964 | Kaufmann . | |
| 3,517,954 | 6/1970 | Snyder et al. . | |
| 3,517,957 | 6/1970 | Vail et al. . | |

OTHER PUBLICATIONS

Data Sheet with title "Sikaflex-1a", by Sika Chemical.

*Primary Examiner*—Andrew V. Kundrat
*Attorney, Agent, or Firm*—Edmund W. Bopp; Larry R. Cassett

[57] ABSTRACT

A urethane adhesive is used on the threads of a preassembled graphite furnace electrode nipple to maintain the nipple in its exact pre-set position during shipment and assembly on the furnace. The urethane adhesive does not prevent intentional disassembly should that be necessary before or after the electrode is put in service on a furnace and because it totally volatilizes in service it does not interfere with the thermal expansion relief provided by the clearances intentionally designed into the nipple threads and the mating threads of the electrode socket.

2 Claims, 1 Drawing Figure

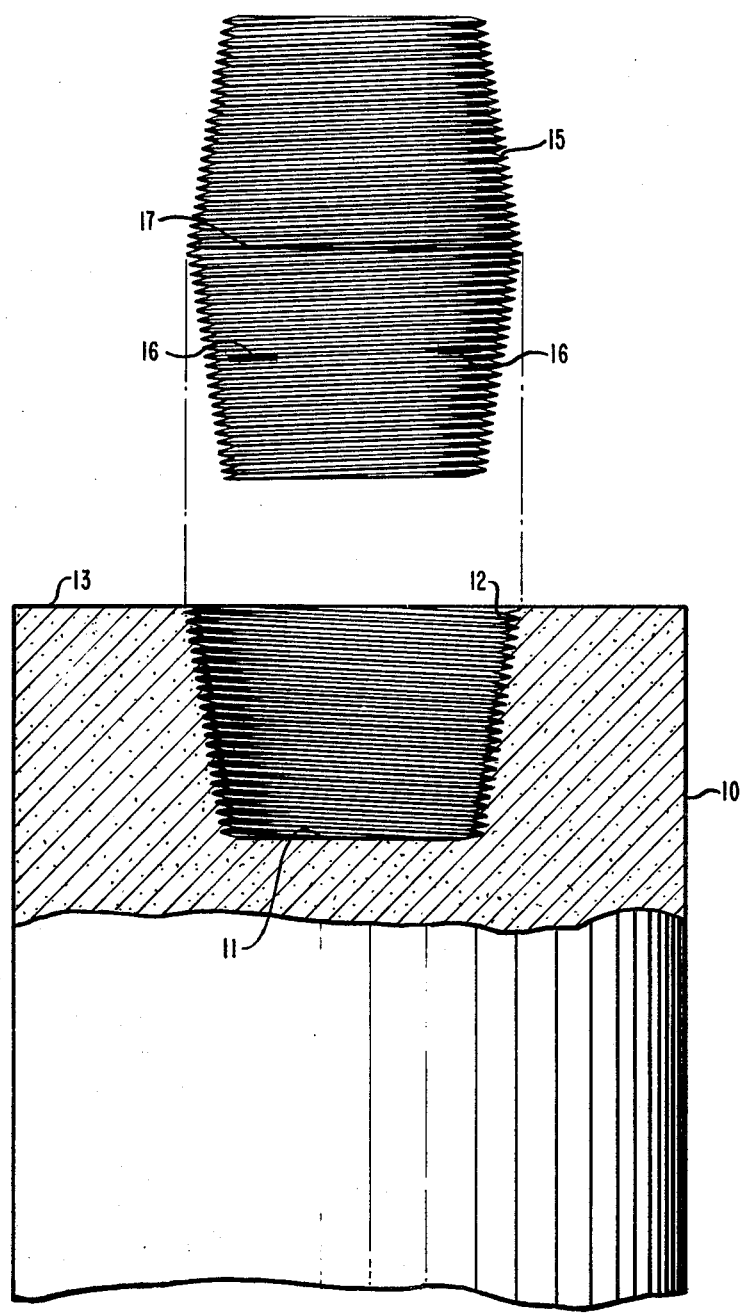

ELECTRODE CONNECTING PIN ASSEMBLY

BACKGROUND OF THE INVENTION

This invention relates to the field of graphite or other carbon electrodes for electric furnaces and like equipment in which the electrodes are consumed in use and continuously fed into the furnace to accommodate such consumption. Such electrodes typically range from 12 to 28 inches (30 to 71 cm) in diameter and from 60 to 110 inches (152 to 279 cm) in length. Electrodes at the upper end of this dimensional range may weigh as much as 4,000 lbs (1,810 Kg). Each end face of each electrode section contains a threaded socket, normally frusto-conical in configuration, to accommodate one end of a double frusto-conical threaded connecting pin. Such pins are commonly referred to in the industry as nipples. By screwing an electrode section on each end of a nipple, successive electrode sections are joined to provide for continuous furnace operation.

In making the above described electrode joint, one end of the nipple is screwed into place in the electrode socket to the approximate center of the nipple measured along its longitudinal axis. This assembly of electrode and nipple with half of the nipple projecting from the end face of the electrode section is then threaded into the empty socket on the end of the preceding electrode section until the end faces of the electrode sections are in contact. With a tapered nipple, its largest diameter is at its longitudinal center which should also be in the plane of contact of the electrode section butt ends.

Since the electrode sections are screwed up on the nipple until the electrode section butt ends are in firm contact, each engaged thread in the assembly has a load bearing flank and a non-load bearing flank. In the nipple threads the thread flank nearer the axial center of the nipple is always the load bearing flank in the completed assembly. Conversely, the flank of each electrode socket thread nearer the axial center of the nipple is the idle flank. The nipples are not screwed into contact with the bottom of the socket.

Because of the great weight of the depending electrode, the compressive stresses imposed by tightening the electrode sections together, the mechanical stresses imposed by furnace operation and the great additional stresses caused by thermal expansion and/or contraction during heating and/or cooling of the assembly in service, the strength of the joint and, in particular, the strength of the nipple are recognized to be critical.

Much attention has been devoted in the past by those skilled in this art to minimizing the effects of this inherent problem. Important in this is recognition by the art of the adverse consequences of assymetric assembly of the nipple into the sockets of abutting electrode sections. When the nipple is properly "centered", i.e., when the largest diameter of the symmetrical frusto-conical nipple is in the plane of the abutting ends of adjacent electrode sections, the thread design of the nipple and socket provides sufficient clearance on the idle flank to accommodate thermally induced dimensional change without creating excessive additional stresses. However, if the nipple is not centered the clearance on the idle flanks may be reduced or eliminated causing excessive stresses to occur when the electrode is in service. The prior art is replete with various suggested expendients for minimizing or overcoming this problem. U.S. Pat. Nos. 2,957,716; 2,970,854; 3,048,433; 3,084,419; 3,088,762; 3,134,616; 3,140,967; 3,517,954 and 3,517,957 all relate directly or indirectly to the problem of centering the nipple and maintaining evenly distributed thread clearance in electrode joints. In general "centering" was accomplished in the prior art in one of two ways. One way was to provide a stop on the thread or at the base of the electrode socket that would physically limit the depth to which the nipple could be screwed into the socket of the first electrode section. In the heat of the furnace this stop would fuse or deform to provide a clearance on the idle thread flank. Any such system is inherently expensive and only as good as the manufacturing tolerances that can be maintained. A mechanical stop can only insure centering if the socket, the socket and nipple threads and the stop device are manufactured to precise dimensions. The other approach in the prior art is to insert the nipple in the first electrode socket only until its equator is in the plane of the electrode end. This can be accomplished by mechanical or optical gauging. The nipple is then locked in this position by some sort of hard locking cement or a rigid metal or graphite pin traversing the interface between nipple and electrode socket to prevent rotational movement between the two. Often the locking cement was designed to carbonize in the furnace and further prevent rotation of the nipple in the socket.

Traditionally it has been the practice to assemble a nipple to a first electrode section at the furnace site and before the electrode section was coupled to the preceding electrode section already on the furnace. More recently furnace operators and electrode manufacturers have recognized certain benefits from preassembling the electrode and nipple at the point of electrode manufacture. Not the least important benefit is that the electrode manufacturer can more accurately and consistently "center" the nipple in the manufacturing plant than can realistically be done on the melt shop floor and thereby assure proper clearances on the idle thread flanks. However, if the nipple is not locked in position it has been found to move significantly ("unwind") during the inevitable shipment and handling preceding positioning on the furnace. If, on the other hand, the nipple is carefully positioned and locked in place by any of the many schemes suggested by the prior art it is impossible to remove the nipple either before or after the electrode is put in service. Such removal is often necessary for any one of a variety of reasons arising out of electric furnace practice. In addition, electrodes are normally stored and shipped with their longitudinal axes in a horizontal position. Since the preassembled nipple is not screwed in tightly it will sag or droop and be misaligned when the locking cement sets. This prevents proper contact between adjacent electrode faces when the next electrode section is screwed on to the half of the nipple projecting from the face of the previous electrode section.

It is therefore an object of the present invention to provide for preassembling a nipple to an electrode section in a precisely centered position to preserve the integrally machined idle flank thread clearances and to secure the nipple in such preset position in a manner to (a) prevent accidental displacement in shipment and handling, (b) permit intentional disassembly should that be necessary, (c) permit limited relative movement between the electrode and nipple to facilitate perfect axial alignment in service and (d) leave the joint and thread clearance spaces free of material of any kind when the electrode is in service to thereby permit unrestricted thermal expansion and contraction to the extent provided for by the idle flank thread clearances.

SUMMARY OF THE INVENTION

The foregoing objects are achieved by applying to the nipple and/or electrode socket threads a small quantity of a polyurethane adhesive that adheres tightly to the graphite parts but remains soft and resilient while exhibiting enough strength to prevent accidental rotation of the nipple in the socket. Because the polyurethane based material does not harden to a rigid condition the nipple can, with sufficient applied force, be deliberately turned and removed from the socket should breakage occur or some other reason arise to make such action desirable. The rubber-like quality of the adhesive allows the nipple to "droop" when in the horizontal position but does not interfere with its returning to a perfectly aligned position when a second electrode section is screwed on and the end faces of the adjacent electrodes abut. Since polyurethane decomposes and vaporizes completely at the temperatures to which the electrode joint is exposed in service the adhesive disappears to allow full benefit of the stress relieving action built into the joint by virtue of the thread clearances provided.

BRIEF DESCRIPTION OF THE DRAWING

The single FIGURE of drawing illustrates, in section, a conventional graphite electrode end with tapered and threaded socket and a conventional double frusto-conical threaded nipple, modified according to the invention, and ready for assembly with the electrode.

DESCRIPTION OF THE PREFERRED EMBODIMENT

Referring now to the drawing, there is illustrated, in section, the end of a conventional graphite electric furnace electrode 10 having a frusto-conical recessed and threaded socket in the end face thereof. The socket is defined by the surface 11 representing the base of the socket and the internal threads 12 on the conical walls of the socket. An externally threaded connecting pin or nipple 15, of the type conventionally used to join adjacent electrode sections is illustrated in non-engaged position but in proximity to the electrode end to make clear its relationship thereto. Also illustrated is an application of a small quantity of a suitable adhesive 16 to one or more of the nipple threads about midway along one of the threaded frusto-conical surfaces of the nipple.

In accordance with the present invention the adhesive material applied to the threads is a pliable urethane polymer composition. Urethane is selected because it decomposes and totally vaporizes with no significant residue at a temperature of about 200° C. In addition, it must be of sufficient viscosity to not be absorbed by the graphite. It must quickly set to a "tacky" condition and must be permanently flexible and not harden to a rigid condition. A suitable composition is CONAP DPST-8712 urethane sealant/adhesive supplied by Conap, Inc. This sealant/adhesive adheres to the graphite surface, remains pliable over a service temperature range of −40° C. to 60° C. and has zero coking value at 200° C. Material having similar properties is also available from Sika Chemical Corp. and is identified as Sikaflex-1a. These materials are described as moisture-cured, one component polyurethane-base elastomers.

It has been determined that only a small amount of adhesive is required to perform the desired functions. For example, the adhesive may be applied to either the nipple threads or the socket threads by extrusion thru a nozzle such as a conventional caulking gun to apply a bead of about ¼" diameter. On a 12½"×14" nipple, three ¼" bead segments, each about 1" long and spaced at 120° intervals on one thread are sufficient.

When the nipple to which this adhesive is applied, as described above, is moved into engagement with the electrode socket and turned to engage the threads, the adhesive is partially transferred to the electrode socket. The nipple is preferably screwed into the socket until the centerline or equator 17 of the nipple is perfectly aligned with the surface 13 of the electrode. In this position the proper thread clearance is provided. Such alignment may be done with the aid of jigs or fixtures, with optical devices, by operator visual sighting or by predetermined procedures of threading. As soon as the adhesive begins to set, accidental rotation of the nipple in the electrode socket is prevented. While the amount of urethane adhesive applied to the threads is not material to the invention it has been found (as described above) that a few spots on only one or two threads is sufficient in most cases. This material is spread into a thin film on the thread surfaces as the nipple is screwed into the socket. Furthermore, since no effort need be made to maintain what will be the load bearing thread flanks in engagement the preassembly may be stored and shipped in any gravitational orientation. Usually the electrodes with nipples assembled are stored and transported with the longitudinal axes horizontal. This causes the loosely threaded nipple to "droop", i.e., to have a slight misalignment of its axis with respect to that of the electrode. With other prior art locking cements this is unacceptable because the cement hardens with the nipple in this position and when this electrode-nipple section is screwed into the next electrode socket the faces of the two electrode sections are not parallel. The urethane cement of the present invention is sufficiently pliable to readily accommodate the necessary axial realignment.

Should it be necessary to remove the nipple from the electrode to which it was preassembled, the pliability of the urethane cement permits this without damage to either the electrode or the nipple, although considerable torque must be applied.

When the electrode enters service on the furnace, it is exposed to great heat. At about 200° C. the urethane cement decomposes and evaporates leaving no significant residue on the threads. This, of course, restores to the joint all of the thread clearances provided by the joint design and minimizes the likelihood of damage by thermally induced dimensional changes. Also, should it be necessary to remove an electrode section after it has been heated in the furnace, there is no problem as there is no carbonized residue to lock the threads.

I claim:

1. In an electrode section-nipple preassembly in which the electrode section and the nipple are made from a material selected from carbon and graphite and in which a threaded nipple is screwed into a threaded socket in the end face of an electrode section and the nipple and socket threads are designed and constructed to provide predetermined thread clearance spaces to accommodate thermally induced dimensional instability, the improvement which comprises applying an elastomeric urethane adhesive composition to at least one of the engaging threaded surfaces and loosely threading the nipple into the electrode socket to a predetermined position where it will be restrained by the adhesive from inadvertent rotational movement but not axial realignment until the adhesive reaches a temperature sufficient to vaporize the adhesive.

2. An electrode-electrode connecting pin preassembly comprising a graphite electrode having in an end face thereof, an internally threaded frusto-conical socket, an externally threaded double frusto-conical graphite connecting pin in threaded engagement in said socket and a permanently flexible polymeric urethane adhesive composition applied to at least a portion of said engaged threads to inhibit inadvertent rotation of said connecting pin relative to said electrode section socket, said adhesive being selected to volatilize completely at a temperature not substantially in excess of 200° C.

* * * * *